United States Patent
Lessard (10) Patent No.: US 12,342,982 B2
(45) Date of Patent: Jul. 1, 2025

(54) ROBOTIC CLEANER

(71) Applicant: SHARKNINJA OPERATING LLC, Needham, MA (US)

(72) Inventor: Derek Lessard, Cambridge, MA (US)

(73) Assignee: SharkNinja Operating LLC, Needham, MA (US)

(*) Notice: Subject to any disclaimer, the term of this patent is extended or adjusted under 35 U.S.C. 154(b) by 373 days.

(21) Appl. No.: 17/718,901

(22) Filed: Apr. 12, 2022

(65) Prior Publication Data
US 2022/0322903 A1    Oct. 13, 2022

Related U.S. Application Data (60) Provisional application No. 63/223,681, filed on Jul. 20, 2021, provisional application No. 63/173,875, filed on Apr. 12, 2021.

(51) Int. Cl.
| | |
|---|---|
| A47L 9/28 | (2006.01) |
| A47L 9/00 | (2006.01) |
| A47L 9/04 | (2006.01) |
| G05D 1/00 | (2024.01) |

(52) U.S. Cl.
CPC .............. A47L 9/2852 (2013.01); A47L 9/009 (2013.01); A47L 9/0488 (2013.01); A47L 9/2805 (2013.01); G05D 1/0214 (2013.01); A47L 2201/04 (2013.01)

(58) Field of Classification Search
CPC ...... A47L 9/2852; A47L 9/009; A47L 9/0488; A47L 9/2805; A47L 2201/04; G05D 1/0214; G05D 1/0219
See application file for complete search history.

(56) References Cited

U.S. PATENT DOCUMENTS

| | | |
|---|---|---|
| 2,064,344 A | 12/1936 | Good |
| 3,663,984 A | 5/1972 | Anthony et al. |
| 3,694,848 A | 10/1972 | Alcala |
| 4,070,586 A | 1/1978 | Breslin |
| 4,300,261 A | 11/1981 | Woodward et al. |
| 4,315,344 A | 2/1982 | Woodward et al. |

(Continued)

FOREIGN PATENT DOCUMENTS

| | | |
|---|---|---|
| CN | 1451347 | 10/2003 |
| CN | 101708116 B | 3/2012 |

(Continued)

OTHER PUBLICATIONS

US 8,266,760 B2, 09/2012, Morse et al. (withdrawn)

(Continued)

*Primary Examiner* — David Redding
(74) *Attorney, Agent, or Firm* — Grossman Tucker Perreault & Pfleger, PLLC (57) ABSTRACT

A robotic cleaner may include one or more driven wheels, one or more environmental sensors, at least one of the one or more environmental sensors configured to detect a first obstacle having a first vertically extending surface, one or more edge cleaning implements, and a controller communicatively coupled to the one or more driven wheels and the one or more environmental sensors. In response to detecting the first obstacle, the controller may be configured to cause the robotic cleaner to move through a rotation angle such that at least one of the one or more edge cleaning implements approaches the first vertically extending surface.

16 Claims, 7 Drawing Sheets

(56) References Cited

U.S. PATENT DOCUMENTS

| | | |
|---|---|---|
| 4,393,536 A | 7/1983 | Tapp |
| 4,884,315 A | 12/1989 | Ehnert |
| 5,613,269 A | 3/1997 | Miwa |
| 5,647,092 A | 7/1997 | Miwa |
| 6,237,188 B1 | 5/2001 | Takemoto et al. |
| 6,324,722 B1 | 12/2001 | Takemoto |
| 6,725,500 B2 | 4/2004 | Allen et al. |
| 6,732,404 B2 | 5/2004 | Fukuoka et al. |
| 7,059,012 B2 | 6/2006 | Song et al. |
| 7,225,500 B2 | 6/2007 | Diehl et al. |
| 7,231,687 B2 | 6/2007 | Rew et al. |
| 7,458,130 B1 | 12/2008 | Krymsky et al. |
| 7,555,812 B1 | 7/2009 | Pinney |
| 7,610,651 B2 | 11/2009 | Baek |
| 7,620,476 B2 | 11/2009 | Morse et al. |
| 7,665,181 B2 | 2/2010 | Gebhard et al. |
| 7,761,954 B2 | 7/2010 | Ziegler |
| 7,788,765 B2 | 9/2010 | Allen |
| 7,937,800 B2 | 5/2011 | Yan |
| 8,468,645 B2 | 6/2013 | Kim et al. |
| 8,739,355 B2 | 6/2014 | Morse et al. |
| 8,782,848 B2 | 7/2014 | Ziegler et al. |
| 8,966,707 B2 | 3/2015 | Morse et al. |
| 9,327,407 B2 | 5/2016 | Jones et al. |
| 9,801,510 B2 | 10/2017 | Weiburg et al. |
| 9,854,956 B2 | 1/2018 | Song et al. |
| 10,357,137 B2 | 7/2019 | Holz |
| 10,398,273 B2 | 9/2019 | Watanabe et al. |
| 10,470,629 B2 | 11/2019 | Ziegler et al. |
| 10,602,893 B2 | 3/2020 | Isenberg et al. |
| 10,624,516 B2 | 4/2020 | Cudzilo |
| 10,694,908 B2 | 6/2020 | Yan |
| 10,863,878 B2 | 12/2020 | Royce |
| 11,076,730 B2 | 8/2021 | Lee et al. |
| 2002/0184730 A1 | 12/2002 | Allen et al. |
| 2003/0192144 A1 | 10/2003 | Song et al. |
| 2004/0255425 A1 | 12/2004 | Arai et al. |
| 2006/0190132 A1 | 8/2006 | Morse et al. |
| 2007/0039123 A1 | 2/2007 | Bird |
| 2007/0074371 A1 | 4/2007 | Song et al. |
| 2007/0089262 A1 | 4/2007 | Drevitson et al. |
| 2008/0000043 A1 | 1/2008 | Frederickson |
| 2008/0307602 A1 | 12/2008 | Andriolo et al. |
| 2009/0089964 A1 | 4/2009 | Vanderlinden |
| 2010/0088840 A1 | 4/2010 | Kim et al. |
| 2012/0260454 A1 | 10/2012 | Lester |
| 2013/0058635 A1 | 3/2013 | Vrdoljak |
| 2013/0152337 A1 | 6/2013 | Thorne |
| 2014/0150201 A1 | 6/2014 | McGee et al. |
| 2014/0230179 A1 | 8/2014 | Matsubara et al. |
| 2015/0013102 A1 | 1/2015 | Bilger |
| 2015/0040340 A1 | 2/2015 | Bilger et al. |
| 2015/0135474 A1 | 5/2015 | Gidwell |
| 2015/0297054 A1 | 10/2015 | Weeks et al. |
| 2015/0351596 A1 | 12/2015 | Thorne |
| 2016/0051111 A1 | 2/2016 | Lee |
| 2016/0066754 A1 | 3/2016 | Haegermarck |
| 2016/0095486 A1 | 4/2016 | Al Salameh |
| 2016/0128530 A1 | 5/2016 | Thorne et al. |
| 2016/0174793 A1 | 6/2016 | Burke et al. |
| 2016/0220080 A1 | 8/2016 | Thorne |
| 2016/0220081 A1 | 8/2016 | Xu et al. |
| 2016/0220082 A1 | 8/2016 | Thorne et al. |
| 2016/0324388 A1 | 11/2016 | Vrdoljak et al. |
| 2016/0354931 A1 | 12/2016 | Jones et al. |
| 2016/0374533 A1 | 12/2016 | Innes et al. |
| 2017/0042319 A1 | 2/2017 | Conrad et al. |
| 2017/0112343 A1 | 4/2017 | Innes et al. |
| 2017/0127896 A1 | 5/2017 | Carter et al. |
| 2017/0144810 A1 | 5/2017 | Birdsell |
| 2017/0215667 A1 | 8/2017 | Thorne et al. |
| 2017/0260704 A1 | 9/2017 | De Geyter |
| 2017/0347848 A1 | 12/2017 | Carter et al. |
| 2018/0035854 A1 | 2/2018 | Thorne |
| 2018/0064301 A1 | 3/2018 | Cottrell et al. |
| 2018/0068815 A1 | 3/2018 | Cottrell |
| 2018/0070785 A1 | 3/2018 | Udy et al. |
| 2018/0184866 A1 | 7/2018 | Gebhard et al. |
| 2018/0255991 A1 | 9/2018 | Der Marderosian et al. |
| 2018/0296046 A1 | 10/2018 | Thorne et al. |
| 2018/0306432 A1 | 10/2018 | Ognjen et al. |
| 2018/0325252 A1 | 11/2018 | Hopke et al. |
| 2018/0338654 A1 | 11/2018 | Kelsey |
| 2018/0338656 A1 | 11/2018 | Carter et al. |
| 2019/0038098 A1 | 2/2019 | Thorne et al. |
| 2019/0059668 A1 | 2/2019 | Thorne et al. |
| 2019/0069740 A1 | 3/2019 | Thorne et al. |
| 2019/0069744 A1 | 3/2019 | Liggett et al. |
| 2019/0090701 A1 | 3/2019 | Tonderys et al. |
| 2019/0090705 A1 | 3/2019 | Thorne et al. |
| 2019/0191947 A1 | 6/2019 | Freese et al. |
| 2019/0193120 A1 | 6/2019 | Brown et al. |
| 2019/0246853 A1 | 8/2019 | Sardar et al. |
| 2019/0274500 A1 | 9/2019 | Thorne et al. |
| 2019/0274501 A1 | 9/2019 | Antonisami et al. |
| 2019/0302793 A1 | 10/2019 | Leech et al. |
| 2019/0320865 A1 | 10/2019 | Brown et al. |
| 2019/0320866 A1 | 10/2019 | Thorne et al. |
| 2019/0335968 A1 | 11/2019 | Harting et al. |
| 2019/0343349 A1 | 11/2019 | Clare et al. |
| 2019/0357740 A1 | 11/2019 | Thorne et al. |
| 2019/0374081 A1 | 12/2019 | Michael et al. |
| 2020/0000298 A1 | 1/2020 | Brown et al. |
| 2020/0022543 A1 | 1/2020 | Gill et al. |
| 2020/0022544 A1 | 1/2020 | Gill et al. |
| 2020/0022553 A1 | 1/2020 | Gill et al. |
| 2020/0037833 A1 | 2/2020 | Niedzwecki et al. |
| 2020/0037843 A1 | 2/2020 | Fiebig et al. |
| 2020/0046184 A1 | 2/2020 | Freese et al. |
| 2020/0077855 A1 | 3/2020 | Brown et al. |
| 2020/0085267 A1 | 3/2020 | Thorne et al. |
| 2020/0085269 A1 | 3/2020 | Thorne |
| 2020/0121144 A1 | 4/2020 | Gacin et al. |
| 2020/0121148 A1 | 4/2020 | Hoffman et al. |
| 2020/0138260 A1 | 5/2020 | Sutter et al. |
| 2020/0166949 A1 | 5/2020 | Leech et al. |
| 2020/0170470 A1 | 6/2020 | Liggett et al. |
| 2020/0201348 A1 | 6/2020 | Leech |
| 2020/0205631 A1 | 7/2020 | Brown et al. |
| 2020/0205634 A1 | 7/2020 | Sutter et al. |
| 2020/0237171 A1 | 7/2020 | Xu et al. |
| 2020/0288929 A1 | 9/2020 | Brunner |
| 2020/0288930 A1 | 9/2020 | Wells |
| 2020/0297172 A1 | 9/2020 | Tonderys et al. |
| 2020/0301430 A1 | 9/2020 | Irkliy et al. |
| 2020/0315418 A1 | 10/2020 | Howard et al. |
| 2020/0345196 A1 | 11/2020 | Innes et al. |
| 2020/0367711 A1 | 11/2020 | Thorne et al. |
| 2020/0371526 A1 | 11/2020 | Kamada |
| 2020/0383547 A1 | 12/2020 | Sutter et al. |
| 2021/0007569 A1 | 1/2021 | Howard et al. |
| 2021/0022574 A1 | 1/2021 | Harting |
| 2021/0030227 A1 | 2/2021 | Mathieu et al. |
| 2021/0038032 A1 | 2/2021 | Brown |
| 2021/0059495 A1 | 3/2021 | Gill et al. |
| 2021/0085144 A1 | 3/2021 | Woodrow et al. |
| 2021/0169289 A1 | 6/2021 | Thorne et al. |
| 2021/0175772 A1 | 6/2021 | Aini |
| 2021/0177223 A1 | 6/2021 | Der Marderosian et al. |
| 2021/0186282 A1 | 6/2021 | Mathieu et al. |
| 2021/0204684 A1 | 7/2021 | Heman-Ackah et al. |
| 2021/0254615 A1 | 8/2021 | Burbank |
| 2021/0307581 A1 | 10/2021 | Thorne et al. |
| 2021/0315428 A1 | 10/2021 | Udy et al. |
| 2021/0386261 A1 | 12/2021 | Woodrow et al. |
| 2021/0386262 A1 | 12/2021 | Uchendu et al. |
| 2022/0031131 A1 | 2/2022 | McClay et al. |
| 2022/0031133 A1 | 2/2022 | Der Marderosian et al. |
| 2022/0031134 A1 | 2/2022 | Yang et al. |
| 2022/0061614 A1 | 3/2022 | Yu et al. |
| 2022/0071459 A1 | 3/2022 | Gacin et al. |
| 2022/0095864 A1 | 3/2022 | Der Marderosian et al. |
| 2022/0125256 A1 | 4/2022 | Lessard et al. |
| 2022/0287521 A1 | 9/2022 | Cottrell et al. |

(56) References Cited

U.S. PATENT DOCUMENTS

| | | |
|---|---|---|
| 2022/0322903 A1 | 10/2022 | Lessard |
| 2022/0400922 A1 | 12/2022 | McClay et al. |
| 2022/0408994 A1 | 12/2022 | Hill |
| 2023/0043567 A1 | 2/2023 | Copeland et al. |
| 2023/0070147 A1 | 3/2023 | Harting et al. |
| 2023/0157495 A1 | 5/2023 | Copeland et al. |
| 2023/0248192 A1 | 8/2023 | Brown et al. |
| 2023/0320550 A1 | 10/2023 | Teuscher et al. |
| 2023/0329502 A1 | 10/2023 | Chirikjian |
| 2023/0355065 A1 | 11/2023 | Finnegan |
| 2023/0414052 A1 | 12/2023 | McClay et al. |
| 2024/0008699 A1 | 1/2024 | Innes et al. |
| 2024/0415352 A1 | 12/2024 | McClay et al. |

FOREIGN PATENT DOCUMENTS

| | | |
|---|---|---|
| CN | 208002736 | 10/2018 |
| CN | 109480716 | 3/2019 |
| CN | 208864216 | 5/2019 |
| CN | 210697497 | 6/2020 |
| CN | 211484377 | 9/2020 |
| CN | 211534208 U | 9/2020 |
| CN | 211534245 | 9/2020 |
| CN | 108403007 | 10/2020 |
| CN | 212661761 | 3/2021 |
| CN | 110811434 | 12/2021 |
| DE | 102014105756 | 10/2015 |
| DE | 202017100064 | 5/2018 |
| DE | 112008001234 | 4/2021 |
| EP | 1850725 | 5/2010 |
| EP | 1716801 | 7/2013 |
| EP | 3194660 | 10/2018 |
| EP | 3189384 | 6/2019 |
| EP | 3100659 | 11/2020 |
| ES | 2712425 | 5/2019 |
| ES | 2746858 | 3/2020 |
| JP | H0889448 | 4/1996 |
| JP | 2007029488 | 2/2007 |
| JP | 2013223650 | 10/2013 |
| JP | 2016201096 | 12/2016 |
| KR | 100549042 | 2/2006 |
| WO | 2016038918 | 3/2016 |
| WO | 2019112249 | 6/2019 |
| WO | 2022221274 | 10/2022 |

OTHER PUBLICATIONS

PCT Search Report and Written Opinion mailed Jul. 1, 2022, received in corresponding PCT Application No. PCT/US22/24413, 9 pages.

PCT International Search Report and Written Opinion mailed Dec. 21, 2017, received in PCT/US17/56484, 8 pgs.

Chinese Office Action with English translation issued Jul. 31, 2020, received in Chinese Patent Application No. 201780075887.2, 13 pgs.

Chinese Office Action with English translation issued Jan. 12, 2021, received in Chinese Patent Application No. 201780075887.2, 9 pages.

Chinese Decision of Rejection with English translation issued May 26, 2021, received in Chinese Patent Application No. 201780075887.2, 8 pages.

U.S. Office Action mailed Jun. 18, 2021, received in U.S. Appl. No. 16/341,575, 7 pages.

Chinese First Notification to Make Rectification with English translation issued May 31, 2021, received in Chinese Utility Patent Application No. 20202163160.9, 2 pages.

U.S. Office Action mailed Nov. 23, 2021, received in U.S. Appl. No. 16/341,575, 23 pages.

Chinese Office Action with English translation issued Jul. 11, 2022, received in Chinese Patent Application No. 202080056292.4, 23 pages.

U.S. Office Action mailed Sep. 6, 2022, received in U.S. Appl. No. 16/341,575, 25 pages.

PCT Search Report and Written Opinion, mailed Oct. 20, 2020, received in corresponding PCT Application No. PCT/US2020/45374, 9 pages.

U.S. Office Action mailed Aug. 18, 2022, received in U.S. Appl. No. 16/987,801, 14 pages.

U.S. Office Action mailed Dec. 1, 2022, received in U.S. Appl. No. 16/987,801, 15 pages.

PCT Search Report and Written Opinion mailed Sep. 27, 2023, received in PCT Application No. PCT/US2023/018306, 12 pages.

Extended European Search report dated Mar. 20, 2025, received in European Patent Application No. 22788768.4, with English translation of JP2016201096 patent document annexed to report, 46 pages.

ROBOTIC CLEANER

CROSS-REFERENCE TO RELATED APPLICATIONS

The present application claims the benefit of U.S. Provisional Application Ser. No. 63/173,875 filed on Apr. 12, 2021, entitled Robotic Cleaner and U.S. Provisional Application Ser. No. 63/223,681 filed on Jul. 20, 2021, entitled Robotic Cleaner, each of which are fully incorporated herein by reference.

TECHNICAL FIELD

The present disclosure is generally directed to a robotic cleaner and more specifically to methods of edge cleaning using a robotic cleaner.

BACKGROUND INFORMATION

Autonomous cleaning devices (e.g., robotic cleaners) are configured to autonomously navigate a surface while at least partially cleaning the surface. One example of an autonomous cleaning device is a robotic vacuum cleaner. A robotic vacuum cleaner may include a suction motor, a dust cup fluidly coupled to the suction motor, and one or more driven wheels configured to urge the robotic vacuum cleaner across a surface to be cleaned. In operation, the robotic vacuum cleaner traverses the surface to be cleaned while collecting at least a portion of any debris present on the surface to be cleaned. However, robotic vacuum cleaners may have difficulty cleaning adjacent one or more obstacles (e.g., walls) that extend from the surface to be cleaned as a result of a geometry of the robotic vacuum cleaner. The addition of one or more side brushes that are configured urge debris proximate a periphery of the robotic vacuum cleaner towards a suction inlet of the robotic vacuum cleaner may improve cleaning performance adjacent an obstacle such as a wall. However, the movement behavior of the robotic cleaner when adjacent the obstacle may impact the performance of the one or more side brushes.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a robotic cleaner. The robotic cleaner includes a controller, a suction motor, one or more driven wheels, one or more edge cleaning implements, and one or more environmental sensors. The controller is communicatively coupled to the suction motor, the one or more driven wheels, the one or more edge cleaning implements, and the one or more environmental sensors. The controller is configured to control the operation of one or more of the one or more driven wheels, the one or more edge cleaning implements, and/or the suction motor in response to one or more signals output by the one or more environmental sensors. The controller is further configured to store one or more instructions that cause the robotic cleaner to carry out a method of cleaning proximate to a vertically extending surface (e.g., a wall) in response to at least one of the one or more environmental sensors detecting one or more vertical surfaces proximate the robotic cleaner. The method is configured to cause the robotic cleaner to maneuver such that at least one of the one or more edge cleaning implements approaches at least one vertically extending surface proximate the robotic cleaner.

Figure 1:
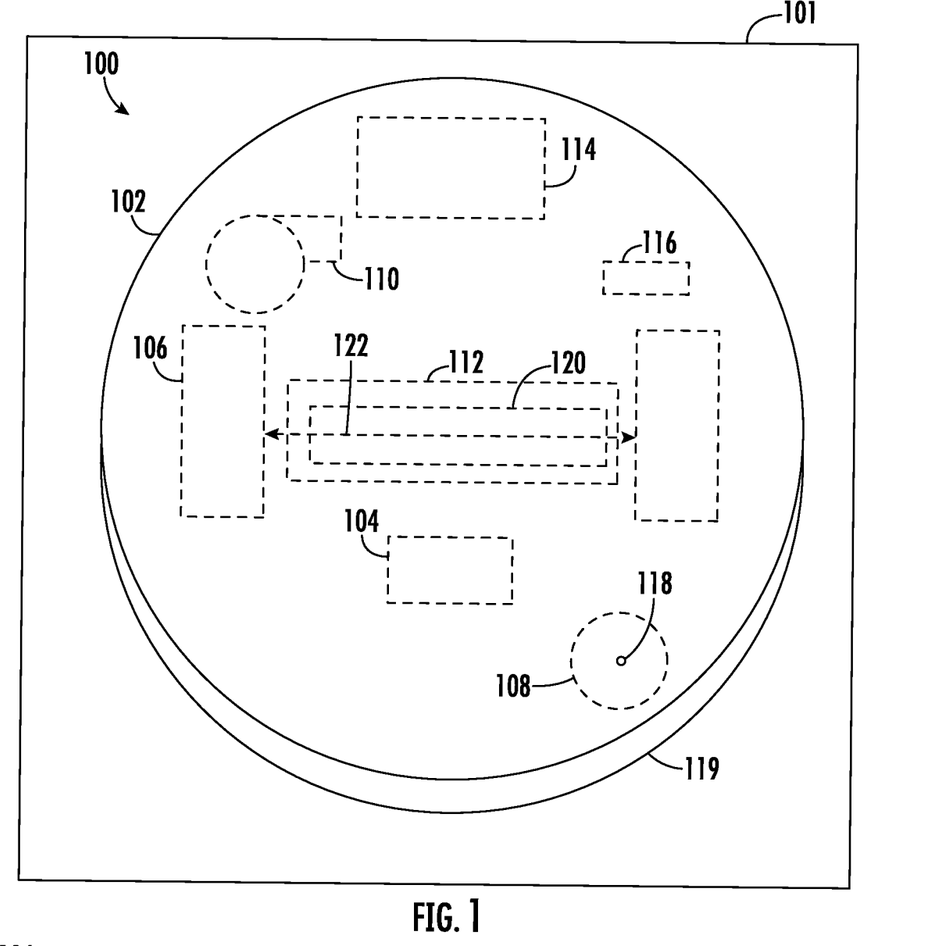
FIG. 1 is a schematic example of a robotic cleaner, consistent with embodiments of the present disclosure.

FIG. 1 shows a schematic example of a robotic cleaner 100 (e.g., a robotic vacuum cleaner). As shown, the robotic cleaner 100 includes a body 102, a controller 104, one or more driven wheels 106, one or more edge cleaning implements 108, a suction motor 110, a suction inlet 112 fluidly coupled to the suction motor 110, a dust cup 114 fluidly coupled to the suction inlet 112 such that the suction motor 110 urges debris into the dust cup 114 through the suction inlet 112, and one or more environmental sensors 116. Examples of the one or more edge cleaning implements 108 may include a side brush (e.g., having one or more bristles that extend within and/or beyond a perimeter of the robotic cleaner 100), an air jet assembly (e.g., configured to generate a directed stream of air that extends outwardly from the body 102 of the robotic cleaner 100 in a manner that is configured to disturb debris adjacent the robotic cleaner 100), and/or any other edge cleaning implement. For the purposes of clarity herein, the one or more edge cleaning implements 108 will be generally discussed in the context of one or more side brushes. The controller 104 is communicatively coupled to one or more of the one or more driven wheels 106, the one or more side brushes 108, the suction motor 110, and/or the one or more environmental sensors 116.

The one or more environmental sensors 116 may be configured to detect one or more obstacles in a movement path of the robotic cleaner 100. An obstacle may include a non-traversable drop-off (e.g., a cliff) in a surface to be cleaned (e.g., a floor) 101 and/or a vertically extending (e.g., a vertical) surface (e.g., a wall or piece of furniture) extending from the surface to be cleaned 101. For example, the controller 104 can be configured to receive at least one input from at least one of the one or more environmental sensors 116 and, based, at least in part, on the input, control the rotational speed of the one or more driven wheels 106 (e.g., to avoid a collision with an obstacle in the path of the robotic cleaner 100). By way of further example, the controller 104 can be configured to receive at least one input from at least one of the one or more environmental sensors 116 indicative of a vertically extending surface of an obstacle (e.g., a wall or furniture) in a movement path of the robotic cleaner 100 and, in response to receiving the signal, cause the robotic cleaner 100 to carry out a method of cleaning proximate to the vertically extending surface. The method of cleaning proximate to the vertically extending surface may include causing the robotic cleaner 100 to move through a rotation angle such that at least one of the one or more side brushes 108 approaches the vertically extending surface.

The one or more environmental sensors 116 may include, for example, one or more of an infrared (IR) sensor, an ultrasonic sensor, a stereo or monocular camera, a tactile switch (e.g., actuated in response to displacement of a displaceable bumper), a magnetic field sensor, and/or any other type of environmental sensor.

The one or more side brushes 108 may be configured to extend within or beyond a periphery of the robotic cleaner 100. For example, each of the one or more side brushes 108 may not extend beyond a periphery of the body 102 of the robotic cleaner 100. In some instances, a rotational speed of the one or more side brushes 108 may be varied. For example, the rotational speed of the one or more side brushes 108 may be varied in response to at least one of the one or more environmental sensors 116 detecting an obstacle. By way of further example, in some instances, the rotational speed of the one or more side brushes 108 may be varied based on a direction of movement (e.g., forward movement, reverse movement, or turning movement).

As shown, the one or more side brushes 108 are configured to rotate about a respective side brush rotational axis 118 that extends transverse to (e.g., perpendicular to) a bottom surface of the body 102 of the robotic cleaner 100. In other words, each side brush rotational axis 118 of the one or more side brushes 108 extends transverse to (e.g., perpendicular to) the surface to be cleaned 101. In some instances, the one or more side brushes 108 may extend substantially (e.g., within 1°, 2°, 5°, or 10° of) perpendicular to the surface to be cleaned 101. The one or more side brushes 108 are configured to rotate about each side brush rotational axis 118 such that the one or more side brushes 108 urge debris on the surface to be cleaned 101 in a direction of a movement path of the suction inlet 112.

As shown, the one or more side brushes 108 may be positioned forward of the suction inlet 112, relative to a forward movement direction of the robotic cleaner 100. In other words, the one or more side brushes 108 may be positioned between a forward most portion of the robotic cleaner 100 (e.g., a displaceable bumper 119) and the suction inlet 112.

The suction inlet 112 may also include an agitator 120 (e.g., a brush roll) configured to rotate about an agitator rotational axis 122. The agitator 120 is configured to agitate the surface to be cleaned 101, dislodging at least a portion of any debris on the surface to be cleaned 101. The agitator rotational axis 122 may extend parallel to or substantially (e.g., within 1°, 2°, 5°, or 10° of) parallel to the surface to be cleaned 101.

Figure 2:
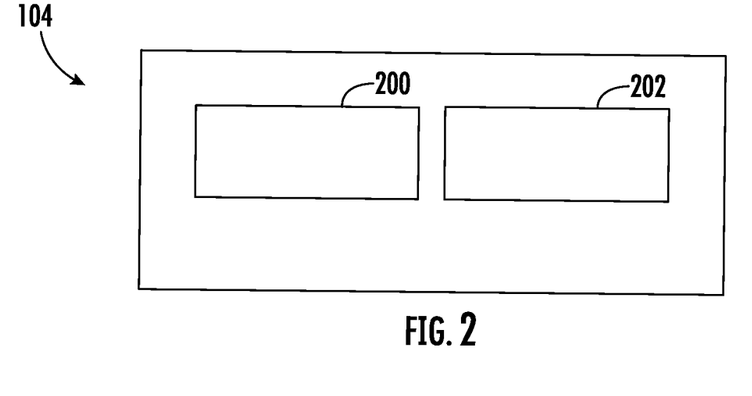
FIG. 2 is a schematic example of a controller of the robotic cleaner of FIG. 1, consistent with embodiments of the present disclosure.

FIG. 2 shows a schematic example of the controller 104. As shown, the controller 104 includes one or more processors 200 and one or more memories 202 (e.g., non-transitory memories) communicatively coupled to the one or more processors 200. The one or more memories 202 are configured to store one or more instructions that are configured to be executed by the one or more processors 200. Execution of the one or more instructions by the one or more processors 200 causes the robotic cleaner 100 to carry out one or more behaviors (e.g., obstacle avoidance, cleaning patterns, movement speed, and/or any other behavior).

FIGS. 3-6 show a schematic example of a robotic cleaner 300, which may be an example of the robotic cleaner 100 of FIG. 1, executing a method of cleaning proximate to a vertically extending surface of an obstacle 302 (e.g., a wall) while following a perimeter of the vertically extending surface. One or more steps of the method shown in FIGS. 3-6 may be embodied as one or more instructions stored in one or more memories (e.g., the one or more memories 202 of FIG. 2), wherein the one or more instructions are configured to be executed on one or more processors (e.g., the one or more processors 200 of FIG. 2). For example, the controller 104 may be configured to cause one or more steps of the method to be carried out. Additionally, or alternatively, one or more steps of the method may be carried out in any combination of software, firmware, or circuitry (e.g., an application-specific integrated circuit).

Figure 3:
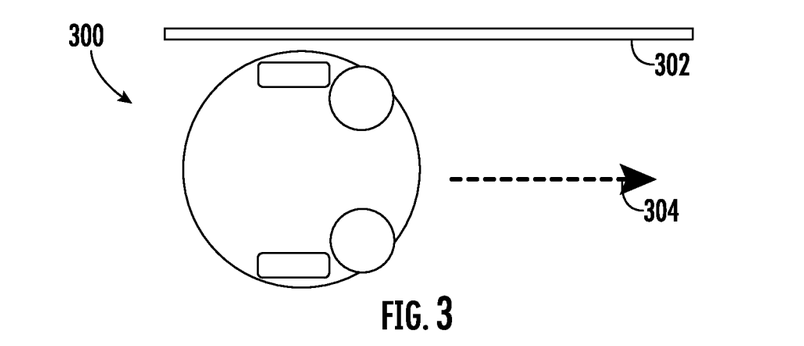
FIG. 3 is a schematic example of a robotic cleaner executing one or more steps of a method of cleaning proximate a vertically extending surface, consistent with embodiments of the present disclosure.

As shown in FIG. 3, the robotic cleaner 300 is travelling along (or following) the obstacle 302 according to a forward movement direction 304. After traveling for a predetermined distance and/or for a predetermined time along the obstacle 302, the robotic cleaner 300 stops forward movement. The predetermined distance may be in a range of, for example, 4 centimeters (cm) to 12 cm. By way of further example, the predetermined distance may be 1 cm, 2 cm, 5 cm, 8 cm, 12 cm, 16 cm, and/or any other predetermined distance. The predetermined time may be in a range of, for example, 0.5 seconds to 3 seconds. By way of further example, the predetermined time may be in a range of 1 second to 2 seconds. By way of still further example, the predetermined time may be 1.5 seconds.

Figure 4:
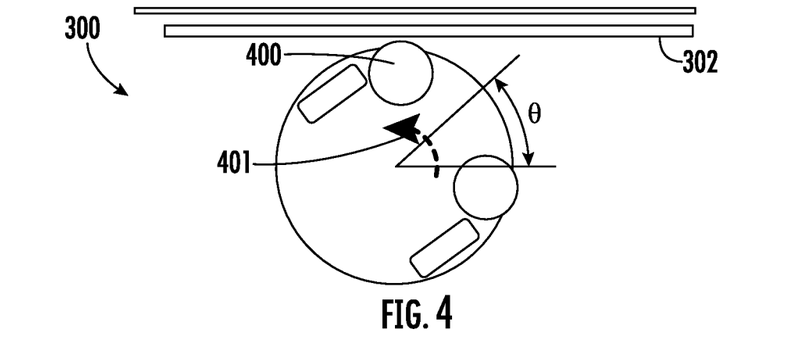
FIG. 4 is a schematic example of the robotic cleaner of FIG. 3 carrying out one or more steps of the method of FIG. 3, consistent with embodiments of the present disclosure.

As shown in FIG. 4, after travelling the predetermined distance and/or for the predetermined time, the robotic cleaner 300 is caused to rotate in a first rotation direction 401 (e.g., counter-clockwise) such that at least one side brush 400 of the robotic cleaner 300 first (or initially) approaches the obstacle 302. The robotic cleaner 300 rotates in the first rotation direction 401 through a rotation angle θ and/or for a predetermined time. Rotation of the robotic cleaner 300 through the rotation angle θ causes the at least one side brush 400 to approach the obstacle 302 and, in some instances, come into engagement (e.g., contact) with the obstacle 302. As such, the side brush 400 urges at least a portion of debris adjacent the obstacle away from the obstacle and towards a movement path of the robotic cleaner 300. When rotating the side brush 400 towards the obstacle 302, the robotic cleaner 300 may be spaced apart from the obstacle 302 by a sufficient distance such that only the side brush 400 contacts the obstacle 302 (e.g., such that a displaceable bumper of the robotic cleaner 300 does not contact the obstacle 302). The rotation angle θ may measure, for example, between 15° and 45°. By way of further example, the rotation angle θ may measure 30°.

Figure 5:
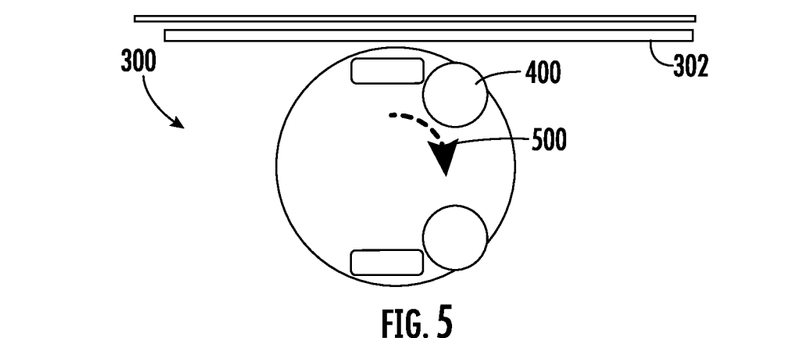
FIG. 5 is a schematic example of the robotic cleaner of FIG. 3 carrying out one or more steps of the method of FIG. 3, consistent with embodiments of the present disclosure.

As shown in FIG. 5, after rotating through the rotation angle θ in the first rotation direction 401, the robotic cleaner 300 rotates through the rotation angle θ and/or for a predetermined time in a second rotation direction 500 (e.g., clockwise), the second rotation direction 500 being opposite the first rotation direction 401. The robotic cleaner 300 rotates back to a position in which the forward movement direction 304 is substantially (e.g., within 1°, 2°, 5°, or 10° of) parallel with at least a portion of the obstacle 302.

Figure 6:
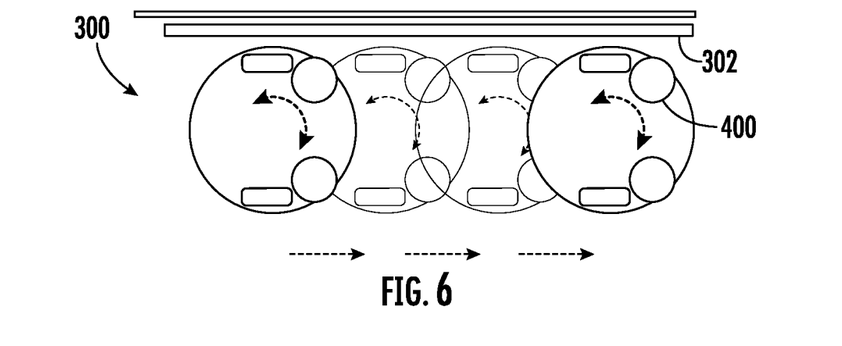
FIG. 6 is a schematic example of the robotic cleaner of FIG. 3 carrying out one or more steps of the method of FIG. 3, consistent with embodiments of the present disclosure.

As shown in FIG. 6, after rotating through the rotation angle θ and/or for the predetermined time in the second rotation direction 500, the robotic cleaner 300 begins to follow the obstacle 302 while moving according to the forward movement direction 304 for a predetermined distance and/or a predetermined time. The robotic cleaner 300 can repeat the steps described in relation to FIGS. 3-6 until, for example, the robotic cleaner 300 reaches the reaches the end of the obstacle 302.

Figure 7:
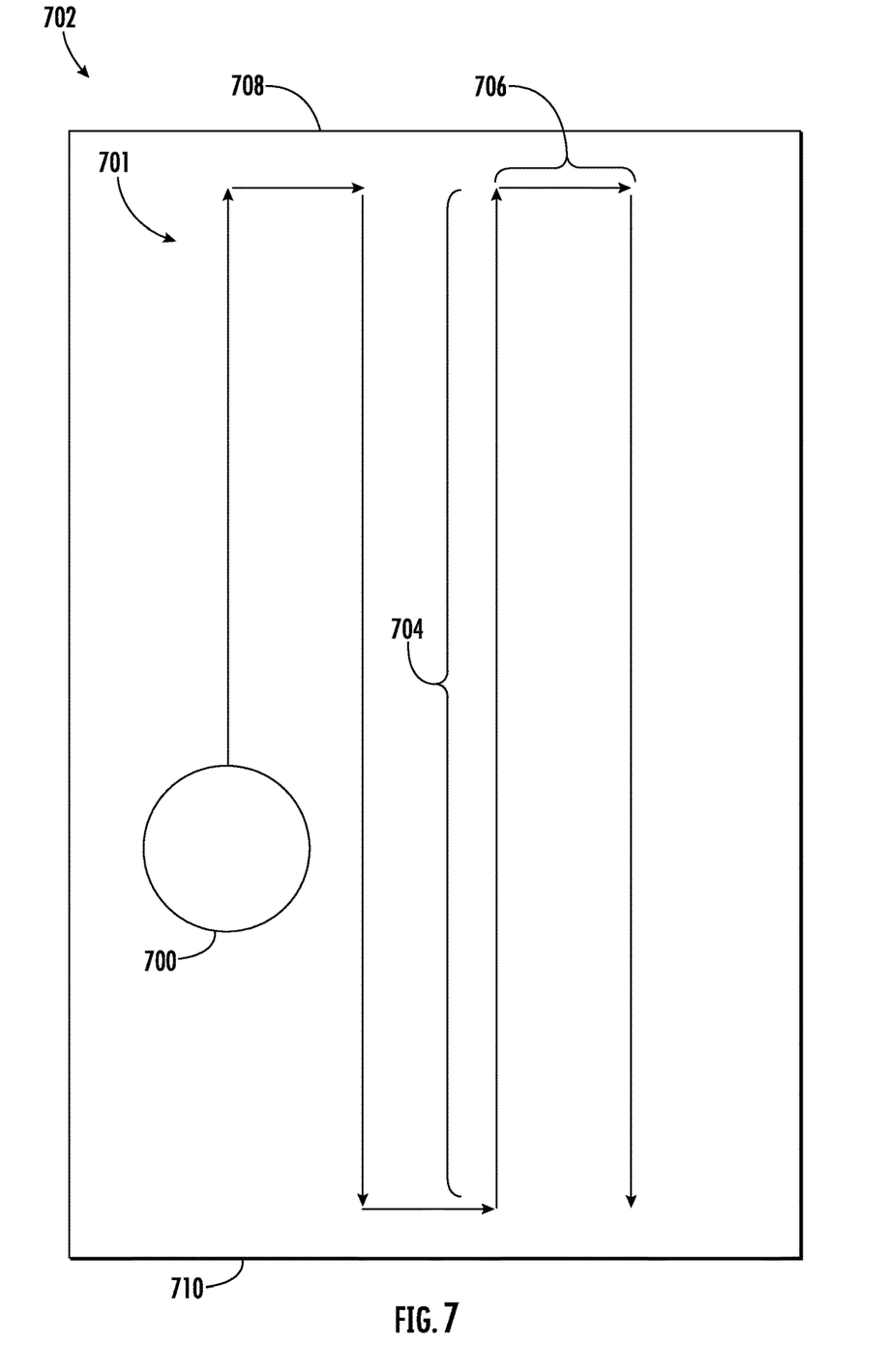
FIG. 7 is a schematic example of a robotic cleaner traveling along a cleaning path having one or more row portions and one or more turn-around portions, consistent with embodiments of the present disclosure.

FIG. 7 shows an example of a robotic cleaner 700, which may be an example of the robotic cleaner 100 of FIG. 1, carrying out a cleaning operation within an area 702 (e.g., a room of a house). As shown, the robotic cleaner 700 is caused to travel along a cleaning path 701. The cleaning path 701 of the robotic cleaner 700 includes one or more row portions 704 and one or more turn-around portions 706. Each row portion 704 extends transverse to (e.g., perpendicular to) an obstacle 708 (e.g., a wall) such that, while traveling according to a forward movement direction, the robotic cleaner 700 approaches the obstacle 708. Each turn-around portion 706 corresponds to a location where the robotic cleaner 700 changes direction. For example, while traveling according to a forward movement direction after traversing a turn-around portion 706 that is proximate to the obstacle 708, the robotic cleaner 700 moves away from the obstacle 708 and towards an opposing obstacle 710.

FIGS. 8-11 show a schematic example of the robotic cleaner 700 of FIG. 7 executing a method of cleaning proximate to a vertically extending surface at the turn-around portions 706 of FIG. 7. One or more steps of the method shown in FIGS. 8-11 may be embodied as one or more instructions stored in one or more memories (e.g., the one or more memories 202 of FIG. 2), wherein the one or more instructions are configured to be executed on one or more processors (e.g., the one or more processors 200 of FIG. 2). For example, the controller 104 may be configured to cause one or more steps of the method to be carried out. Additionally, or alternatively, one or more steps of the method may be carried out in any combination of software, firmware, or circuitry (e.g., an application-specific integrated circuit).

Figure 8:
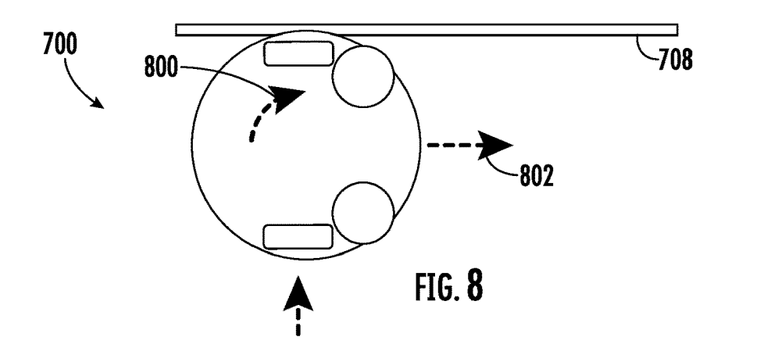
FIG. 8 is a schematic example of a robotic cleaner of FIG. 7 executing one or more steps of a method of cleaning proximate to a vertically extending surface at a respective one of the turn-around portions of FIG. 7, consistent with embodiments of the present disclosure.
Figure 9:
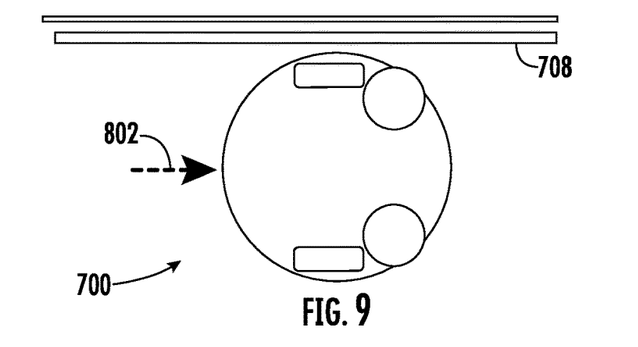
FIG. 9 is a schematic example of the robotic cleaner of FIG. 7 carrying out one or more steps of the method of FIG. 8, consistent with embodiments of the present disclosure.

As shown in FIG. 8 when the robotic cleaner 700 reaches a respective turn-around portion 706 the robotic cleaner 700 is caused to rotate in a first rotation direction 800 (e.g., clockwise) such that a forward movement direction 802 extends substantially (e.g., within 1°, 2°, 5°, or 10° of) parallel to at least a portion of the obstacle 708. As shown in FIG. 9, after rotating such that the forward movement direction 802 extends substantially parallel to at least a portion of the obstacle 708, the robotic cleaner 700 moves along (or follows) the obstacle 708 in the forward movement direction 802 for a predetermined distance and/or a predetermined time. The predetermined distance may correspond to, for example, half the cleaning width of the robotic cleaner 700 (or less than half the cleaning width of the robotic cleaner 700).

Figure 10:
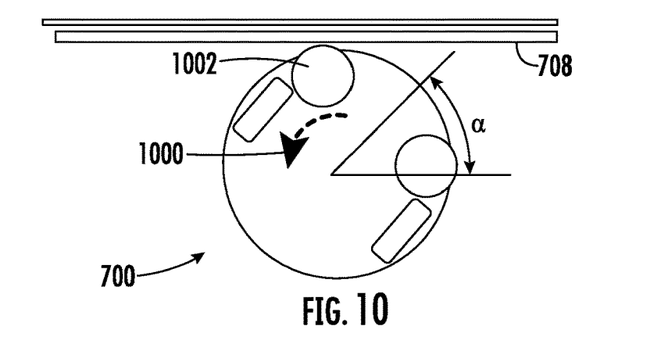
FIG. 10 is a schematic example of the robotic cleaner of FIG. 7 carrying out one or more steps of the method of FIG. 8, consistent with embodiments of the present disclosure.

As shown in FIG. 10, after traveling the predetermined distance and/or for the predetermined time in the forward movement direction 802, the robotic cleaner 700 is caused to stop and rotate in a second rotation direction 1000 (e.g., counter-clockwise) through a rotation angle α and/or for a predetermined time, the second rotation direction 1000 being opposite the first rotation direction 800. Rotation of the robotic cleaner 700 through the rotation angle α causes the at least one side brush 1002 of the robotic cleaner 700 to first (or initially) approach the obstacle 708 and, in some instances, brings the at least one side brush 1002 into engagement (e.g., contact) with the obstacle 708. As such, the side brush 1002 urges at least a portion of debris adjacent the obstacle away from the obstacle and towards a movement path of the robotic cleaner 700. When rotating the side brush 1002 towards the obstacle 708, the robotic cleaner 700 may be spaced apart from the obstacle 708 by a sufficient distance such that only the side brush 1002 contacts the obstacle 302 (e.g., such that a displaceable bumper of the robotic cleaner 700 does not contact the obstacle 708). The rotation angle α may measure, for example, between 30° and 60°. By way of further example, the rotation angle α may measure 45°.

Figure 11:
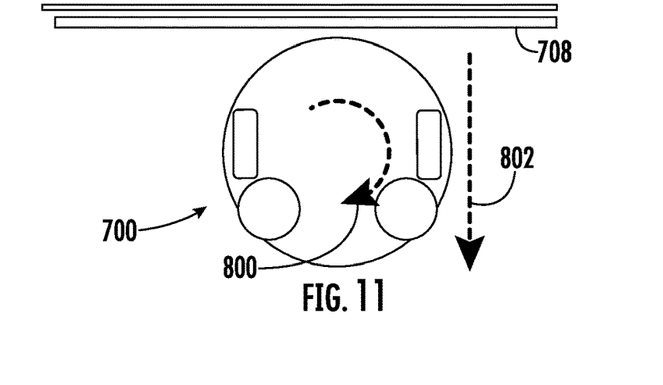
FIG. 11 is a schematic example of the robotic cleaner of FIG. 7 carrying out one or more steps of the method of FIG. 8, consistent with embodiments of the present disclosure.

As shown in FIG. 11, after rotating through the rotation angle α and/or for the predetermined time in the second rotation direction 1000, the robotic cleaner 700 rotates in the first rotation direction 800 until the forward movement direction 802 extends substantially parallel to at least one of the one or more row portions 704. For example, the robotic cleaner 700 may rotate through the rotation angle α plus an additional 90° in the first rotation direction 800. After completing rotation, the robotic cleaner 700 may travel along a respective row portion 704 in a direction away from the obstacle 708 until the robotic cleaner 700 reaches another turn-around portion 706 adjacent the opposing obstacle 710. Upon reaching the later turn-around portion 706, the robotic cleaner 700 may carry out the steps described in relation to FIGS. 8-11. The method shown in FIGS. 8-11 may be carried out until, for example, the robotic cleaner 300 completes cleaning within the area 702.

FIGS. 12-15 show a schematic example of a robotic cleaner 1200, which may be an example of the robotic cleaner 100 of FIG. 1, executing a method of cleaning proximate to a vertically extending surface at a corner region 1208 (e.g., a region where a first and second obstacle 1202 and 1204 intersect). One example of the corner region 1208 may include a region defined at the intersection of a first wall with a second wall (e.g., a region where the first and second walls intersect at a substantially perpendicular angle). One or more steps of the method shown in FIGS. 12-15 may be embodied as one or more instructions stored in one or more memories (e.g., the one or more memories 202 of FIG. 2), wherein the one or more instructions are configured to be executed on one or more processors (e.g., the one or more processors 200 of FIG. 2). For example, the controller 104 may be configured to cause one or more steps of the method to be carried out. Additionally, or alternatively, one or more steps of the method may be carried out in any combination of software, firmware, or circuitry (e.g., an application-specific integrated circuit).

Figure 12:
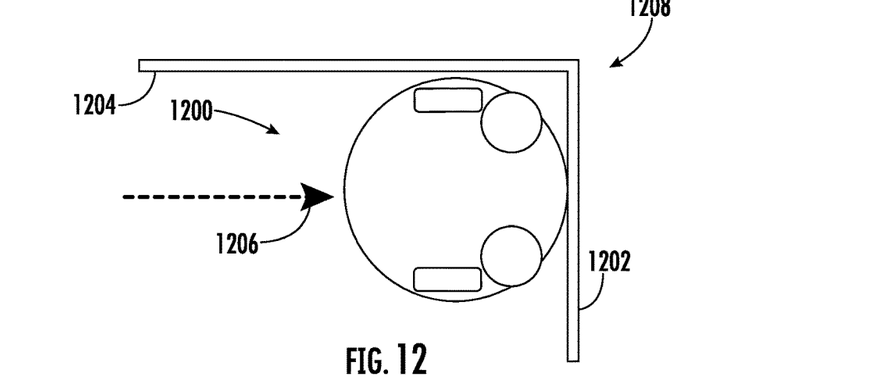
FIG. 12 is a schematic example of a robotic cleaner executing one or more steps of a method of cleaning proximate to a vertically extending surface at a corner region, consistent with embodiments of the present disclosure.

As shown in FIG. 12, the robotic cleaner 1200 is traveling according to a forward movement direction 1206 in a direction of the corner region 1208 (e.g., in a direction substantially parallel to the second obstacle 1204). The corner region 1208 is defined by the first obstacle 1202 and the second obstacle 1204 (e.g., at an intersection of the first and second obstacle 1202 and 1204). The robotic cleaner 1200 can be configured to detect the first obstacle 1202 using at least one environmental sensor as the robotic cleaner 1200 approaches the first obstacle 1202. As shown, the robotic cleaner 1200 is brought into engagement (e.g., contact) with the first obstacle 1202 while following the second obstacle 1204. For example, the robotic cleaner 1200 may engage the first obstacle 1202 such that a displaceable bumper of the robotic cleaner 1200 is displaced, actuating one or more tactile switches.

Figure 13:
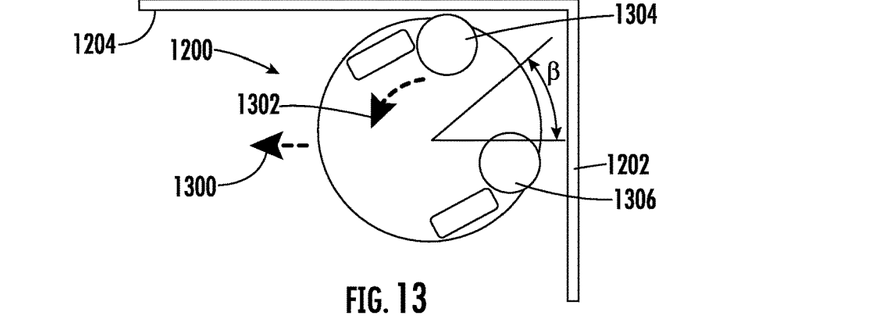
FIG. 13 is a schematic example of the robotic cleaner of FIG. 12 carrying out one or more steps of the method of FIG. 12, consistent with embodiments of the present disclosure.

As shown in FIG. 13, in response engaging the first obstacle 1202 (e.g., in response to the displaceable bumper actuating one or more tactile switches), the robotic cleaner 1200 is caused to move in a rearward movement direction 1300 for a predetermined distance and/or for a predetermined time, the rearward movement direction 1300 being opposite the forward movement direction 1206. Movement in the rearward movement direction 1300 for the predetermined distance and/or for the predetermined time may be, for example, sufficient to allow the robotic cleaner 1200 to rotate relative to the first and second obstacles 1202 and 1204 (e.g., without contacting the obstacles 1202 and 1204). After moving in the rearward movement direction 1300 for the predetermined distance and/or for the predetermined time, the robotic cleaner 1200 is caused to rotate according to a first rotation direction 1302 (e.g., counter-clockwise) through a rotation angle β and/or for a predetermined time. The rotation angle β may measure, for example, in a range of 15° to 45°. By way of further example, the rotation angle β may measure 30°.

As shown, when rotating through the rotation angle β in the first rotation direction 1302 and/or for the predetermined time, a first side brush 1304 of the robotic cleaner 1200 is caused to first (or initially) approach the second obstacle 1204 and a second side brush 1306 of the robotic cleaner 1200 is caused to first (or initially) approach the first obstacle 1202. In some instances, one or more of the first and/or second side brushes 1304 and 1306 may come into engagement (e.g., contact) with the first and second obstacles 1202 and 1204.

Figure 14:
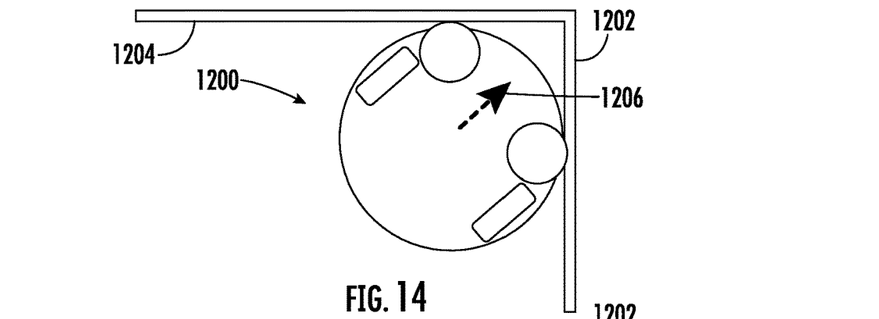
FIG. 14 is a schematic example of the robotic cleaner of FIG. 12 carrying out one or more steps of the method of FIG. 12, consistent with embodiments of the present disclosure.

As shown in FIG. 14, after rotating through the rotation angle β and/or for the predetermined time in the first rotation direction 1302, the robotic cleaner 1200 is caused to move according to the forward movement direction 1206 until the robotic cleaner 1200 comes into engagement (e.g., contact) with the first and second obstacles 1202 and 1204. For example, the robotic cleaner 1200 may continue to move in the forward movement direction 1206 until a displaceable bumper of the robotic cleaner 1200 is displaced, actuating one or more tactile switches. In some instances, after contacting the first and second obstacles 1202 and 1204, the robotic cleaner 1200 may move in a reverse movement direction until the robotic cleaner 1200 comes out of engagement with the first and second obstacles 1202 and 1204.

Figure 15:
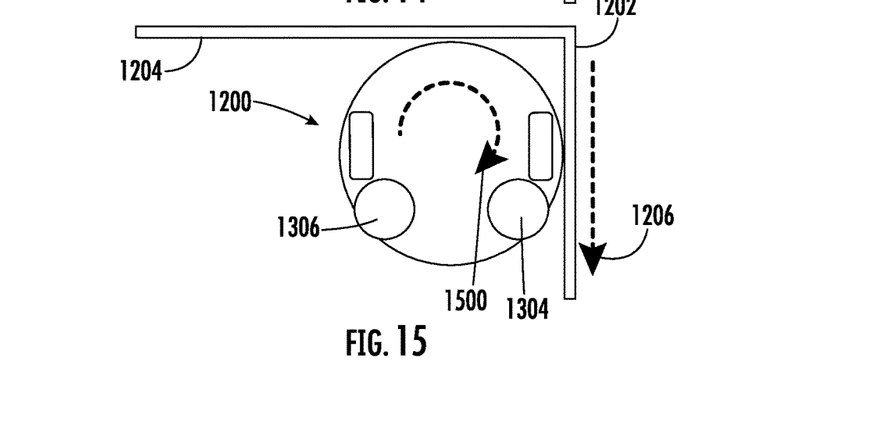
FIG. 15 is a schematic example of the robotic cleaner of FIG. 12 carrying out one or more steps of the method of FIG. 12, consistent with embodiments of the present disclosure.

As shown in FIG. 15, after the robotic cleaner 1200 has moved into engagement with the first and second obstacles 1202 and 1204, the robotic cleaner 1200 is caused to rotate in a second rotation direction 1500 (e.g., clockwise), the second rotation direction 1500 being opposite the first rotation direction 1302. As the robotic cleaner 1200 rotates according to the second rotation direction 1500, the first and second side brushes 1304 and 1306 are configured to urge debris adjacent the first and second obstacles 1202 and 1204 towards a movement path of a suction inlet of the robotic cleaner 1200. As shown, the robotic cleaner 1200 continues to rotate according the second rotation direction 1500 until the forward movement direction 1206 of the robotic cleaner 1200 is substantially parallel to at least a portion of the first obstacle 1202, allowing the robotic cleaner 1200 to move along (or follow) a perimeter of the first obstacle 1202.

FIGS. 16-19 show a schematic example of a robotic cleaner 1600, which may be an example of the robotic cleaner 100 of FIG. 1, executing a method of cleaning proximate to a vertically extending surface at a corner region 1608 (e.g., a location where a first and second obstacle 1602 and 1604 intersect). One or more steps of the method shown in FIGS. 16-19 may be embodied as one or more instructions stored in one or more memories (e.g., the one or more memories 202 of FIG. 2), wherein the one or more instructions are configured to be executed on one or more processors (e.g., the one or more processors 200 of FIG. 2). For example, the controller 104 may be configured to cause one or more steps of the method to be carried out. Additionally, or alternatively, one or more steps of the method may be carried out in any combination of software, firmware, or circuitry (e.g., an application-specific integrated circuit).

Figure 16:
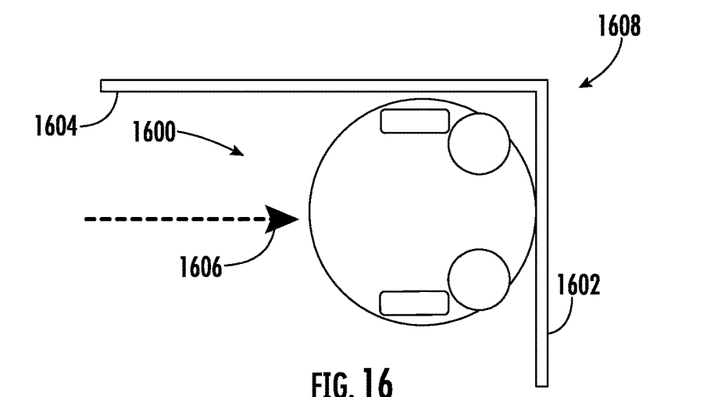
FIG. 16 is a schematic example of a robotic cleaner executing one or more steps of a method of cleaning proximate to a vertically extending surface at a corner region, consistent with embodiments of the present disclosure.

As shown in FIG. 16, the robotic cleaner 1600 is traveling according to a forward movement direction 1606 in a direction of the corner region 1608 (e.g., in a direction substantially parallel to the second obstacle 1604). The corner region 1608 is defined by the first obstacle 1602 and the second obstacle 1604 (e.g., at an intersection of the first and second obstacle 1602 and 1604). As shown, the robotic cleaner 1600 is brought into engagement (e.g., contact) with the first obstacle 1602. For example, the robotic cleaner 1600 may engage the first obstacle 1602 such that a displaceable bumper of the robotic cleaner 1600 is displaced, actuating one or more tactile switches. In some instances, in response to the displaceable bumper being displaced, the robotic cleaner 1600 may move in a reverse movement direction such that the displaceable bumper comes out of engagement with the first obstacle 1602, the reverse movement direction being opposite the forward movement direction 1606.

Figure 17:
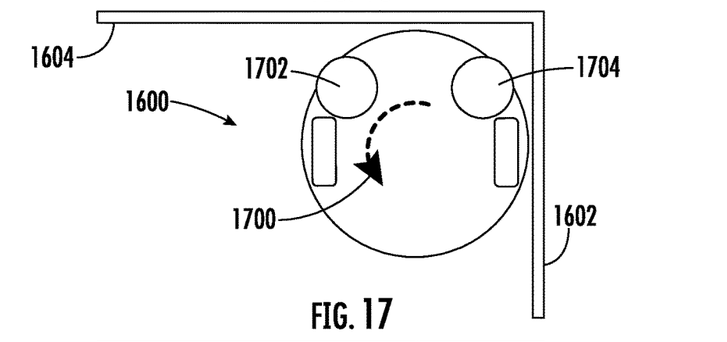
FIG. 17 is a schematic example of the robotic cleaner of FIG. 16 carrying out one or more steps of the method of FIG. 16, consistent with embodiments of the present disclosure.
Figure 18:
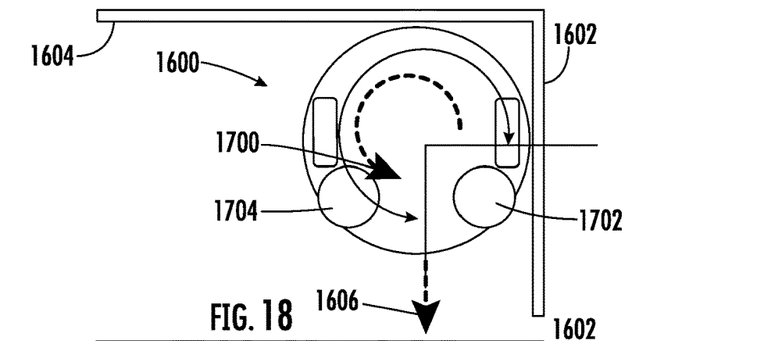
FIG. 18 is a schematic example of the robotic cleaner of FIG. 16 carrying out one or more steps of the method of FIG. 16, consistent with embodiments of the present disclosure.

As shown in FIGS. 17 and 18, after engaging the first obstacle 1602 (e.g., after the displaceable bumper actuates one or more tactile switches), the robotic cleaner 1600 is caused to rotate according to a first rotation direction 1700 (e.g., counter-clockwise) through a rotation angle c and/or for a predetermined time. As shown, when rotating through the rotation angle c and/or for the predetermined time in the first rotation direction 1700, a first side brush 1702 of the robotic cleaner 1600 is caused to first (or initially) approach the second obstacle 1604 and a second side brush 1704 of the robotic cleaner 1600 is caused to first (or initially) approach the first obstacle 1602 and the second obstacle 1604. In some instances one or more of the first and second side brushes 1702 and 1704 may come into engagement (e.g., contact) with one or more of the first and/or second obstacles 1602 and 1604.

As shown, the robotic cleaner 1600 rotates in the first rotation direction 1700 until the forward movement direction 1606 is substantially parallel to at least a portion of the first obstacle 1602. The rotation angle c may measure in a range of, for example, 255° and 285°. By way of further example, the rotation angle c may measure 270°. By way of still further example, the rotation angle c may measure greater than 90°, 95°, or 100°.

Figure 19:
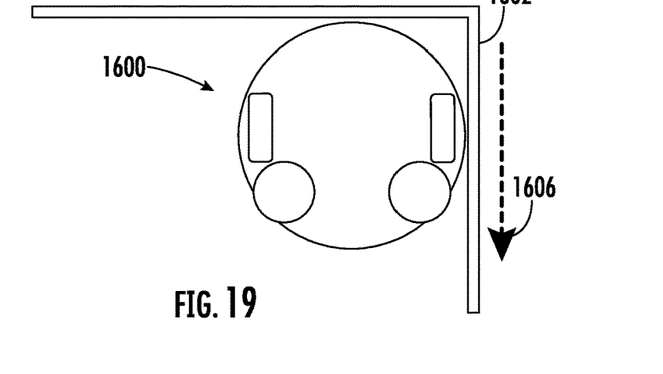
FIG. 19 is a schematic example of the robotic cleaner of FIG. 16 carrying out one or more steps of the method of FIG. 16, consistent with embodiments of the present disclosure.

As shown in FIG. 19, after rotation through the rotation angle c is complete and the forward movement direction 1606 is substantially parallel to at least a portion of the first obstacle 1602, the robotic cleaner 1600 is caused to move in the forward movement direction 1606 and follow the perimeter of the first obstacle 1602.

Figure 20:
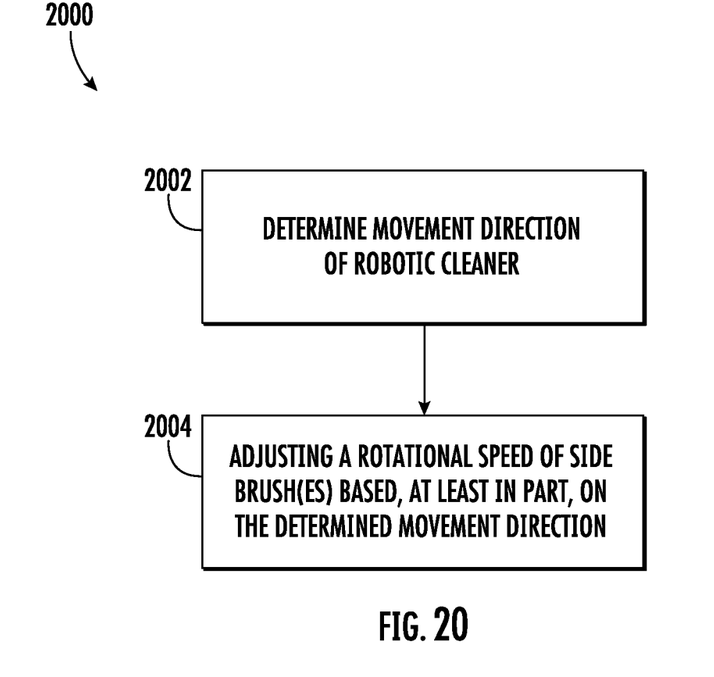
FIG. 20 is a flow chart of an example of a side brush control method, consistent with embodiments of the present disclosure.

FIG. 20 shows a flow chart of an example of a side brush control method 2000. The method 2000 may be embodied as one or more instructions stored in one or more memories (e.g., non-transitory computer readable memories), wherein the one or more instructions are configured to be executed on one or more processors. For example, a controller (e.g., the controller 104 of FIG. 1) may be configured to cause one or more steps of the method 2000 to be carried out. Additionally, or alternatively, one or more steps of the method 2000 may be carried out in any combination of software, firmware, or circuitry (e.g., an application-specific integrated circuit).

As shown, the method 2000 includes a step 2002. The step 2002 may include determining a movement direction of a robotic cleaner (e.g., the robotic cleaner 100 of FIG. 1). The movement direction may include forward movement, reverse movement, or turning movement (e.g., left or right turning movement). When a turning movement is determined, the step 2002 may further include determining a direction of turning (e.g., left/right or clockwise/counter-clockwise).

The method 2000 includes a step 2004. The step 2004 may include adjusting a rotational speed of one or more side brushes based, at least in part, on the determined movement direction. Adjusting the rotational speed of one or more side brushes based, at least in part, on the determined movement direction may mitigate or prevent damage to the side brush, damage to a surface being cleaned, and/or side brush entanglement (e.g., resulting in an unintended stoppage of the side brush).

When moving in the forward direction, the one or more side brushes may operate at a cleaning speed. The cleaning speed may be, for example, in a range of 40% to 94% of a maximum rotation speed of the one or more side brushes. By way of further example, the cleaning speed may be 67% of the maximum rotation speed of the one or more side brushes. When moving in the reverse direction, the one or more side brushes may operate at a reversing speed, the reversing speed being less than the cleaning speed. The reversing speed may be, for example, in a range of 20% to 40% of the maximum rotation speed of the one or more side brushes. By way of further example, the reversing speed may be 30% of the maximum rotation speed of the one or more side brushes. When turning, the one or more side brushes may operate at a turning speed, the turning speed being less than the cleaning speed. The turning speed may be, for example, in a range of 20% to 40% of the maximum rotation speed of the one or more side brushes. By way of further example, the turning speed may be 30% of the maximum rotation speed of the one or more side brushes. In some instances, the turning speed and the reversing speed may be the same.

When the robotic cleaner includes two or more side brushes (e.g., a left side brush and a right side brush), at least one side brush may be operated at the turning speed and at least one other side brush may be operated at the cleaning speed based, at least in part, on the determined turning direction. For example, when turning, an inside side brush (e.g., the side brush closest to the center of the rotational arc of the turn) may be operated at the turning speed and an outside side brush (e.g., the side brush furthest from the center of the rotational arc of the turn) may be operated at the cleaning speed. By way of further example, when the robotic cleaner is turning left, a side brush corresponding to a left side of the robotic cleaner may be operated at the turning speed and a side brush corresponding to a right side of the robotic cleaner may be operated at the cleaning speed. By way of still further example, when the robotic cleaner is turning right, a side brush corresponding to a right side of the robotic cleaner may be operated at the turning speed and a side brush corresponding to a left side of the robotic cleaner may be operated at the cleaning speed.

While the cleaning speed, reversing speed, and turning speed of the one or more side brushes is described in the context of percent of maximum rotation speed, the cleaning speed, reversing speed, and turning speed may be expressed in a manner independent of maximum rotation speed. For example, the cleaning speed, reversing speed, and turning speed may be expressed in terms of rotations per minute (RPM), voltage supplied to the one or more side brushes, and/or any other metric.

An example of a robotic cleaner, consistent with the present disclosure, may include one or more driven wheels, one or more environmental sensors, at least one of the one or more environmental sensors configured to detect a first obstacle having a first vertically extending surface, one or more edge cleaning implements, and a controller communicatively coupled to the one or more driven wheels and the one or more environmental sensors. In response to detecting the first obstacle, the controller is configured to cause the robotic cleaner to move through a rotation angle such that at least one of the one or more edge cleaning implements approaches the first vertically extending surface.

In some instances, the controller may be configured cause the robotic cleaner to follow the first vertically extending surface of the first obstacle. In some instances, the controller may be configured to cause the robotic cleaner to follow the first vertically extending surface of the first obstacle for a predetermined distance. In some instances, the predetermined distance may be in a range of 4 cm to 12 cm. In some instances, controller may be configured to cause the robotic cleaner to rotate through the rotation angle in a first rotation direction after traveling the predetermined distance. In some instances, the controller may be configured to cause the robotic cleaner to rotate through the rotation angle in a second rotation direction after rotating through the rotation angle in the first rotation direction, the second rotation direction being opposite the first rotation direction. In some instances, the controller may be configured to cause the robotic cleaner to travel along a cleaning path having one or more row portions and one or more turn-around portions, at least one turn-around portion being proximate the first vertically extending surface of the first obstacle. In some instances, the controller may be configured to cause the robotic cleaner to follow the first obstacle for a predetermined distance. In some instances, the predetermined distance may be less than or equal to half a cleaning width of the robotic cleaner. In some instances, the controller may be configured to cause the robotic cleaner to rotate through the rotation angle in a first rotation direction after traveling the predetermined distance. In some instances, the controller may be configured to cause the robotic cleaner to rotate in a second rotation direction after rotating through the rotation angle in the first rotation direction, the second rotation direction being opposite the first rotation direction. In some instances, the controller may be configured to cause the robotic cleaner to travel along a respective row portion after rotating through the rotation angle in the second rotation direction. In some instances, at least one of the environmental sensors may be configured to detect a second obstacle having a second vertically extending surface, the first and second vertically extending surfaces intersecting to form a corner region. In some instances, the controller may be configured to cause the robotic cleaner to contact the second obstacle while following the first vertically extending surface of the first obstacle. In some instances, the controller may be configured to cause the robotic cleaner to rotate through the rotation angle in a first rotation direction after contacting the second obstacle. In some instances, the controller may be configured to cause the robotic cleaner to rotate in a second rotation direction after rotating through the rotation angle in the first rotation direction, the second rotation direction being opposite the first rotation direction. In some instances, the controller may be configured to cause the robotic cleaner to rotate in the second rotation direction until a forward movement direction of the robotic cleaner is substantially parallel with at least a portion of the second obstacle. In some instances, the controller may be configured to cause the robotic cleaner to rotate in the first rotation direction until a forward movement direction of the robotic cleaner is substantially parallel with at least a portion of the second obstacle. In some instances, the rotation angle may be in a range of 255° to 285°. In some instances, the one or more edge cleaning implements may include a side brush.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
   one or more driven wheels;
   one or more environmental sensors configured to detect a corner region that is formed at an intersection of a first vertically extending surface of a first obstacle and a second vertically extending surface of a second obstacle;
   one or more edge cleaning implements; and
   a controller communicatively coupled to the one or more driven wheels and the one or more environmental sensors, the controller is configured to:
      cause the robotic cleaner to follow the second vertically extending surface of the second obstacle in a direction of the first obstacle;
      after at least one of the one or more environmental sensors detect the first obstacle, cause the robotic cleaner to rotate through a rotation angle according to a first rotation direction such that at least one of the one or more edge cleaning implements moves along the second vertically extending surface and away from the first vertically extending surface; and
      after moving through the rotation angle according to the first rotation direction, causing the robotic cleaner to follow the first vertically extending surface of the first obstacle.

2. The robotic cleaner of claim 1, wherein the controller is configured to cause the robotic cleaner to follow the first vertically extending surface of the first obstacle for a predetermined distance.

3. The robotic cleaner of claim 2, wherein the predetermined distance is in a range of 4 cm to 12 cm.

4. The robotic cleaner of claim 1, wherein the controller is configured to cause the robotic cleaner to rotate through the rotation angle in a second rotation direction after rotating through the rotation angle in the first rotation direction, the second rotation direction being opposite the first rotation direction.

5. The robotic cleaner of claim 1, wherein the controller is configured to cause the robotic cleaner to travel along a cleaning path having one or more row portions and one or more turn-around portions, at least one turn-around portion being proximate the first vertically extending surface of the first obstacle.

6. The robotic cleaner of claim 5, wherein the controller is configured to cause the robotic cleaner to follow the first obstacle for a predetermined distance.

7. The robotic cleaner of claim 6, wherein the predetermined distance is less than or equal to half a cleaning width of the robotic cleaner.

8. The robotic cleaner of claim 6, wherein the controller is configured to cause the robotic cleaner to rotate in a second rotation direction after traveling the predetermined distance.

9. The robotic cleaner of claim 8, wherein the controller is configured to cause the robotic cleaner to travel along a respective row portion after rotating through the rotation angle in the second rotation direction.

10. The robotic cleaner of claim 1, wherein the controller is configured to cause the robotic cleaner to contact the first second obstacle while following the second first-vertically extending surface of the second first obstacle.

11. The robotic cleaner of claim 10, wherein the controller is configured to cause the robotic cleaner to rotate in the through the rotation angle in a-first rotation direction after contacting the first second obstacle.

12. The robotic cleaner of claim 11, wherein the controller is configured to cause the robotic cleaner to rotate in a second rotation direction after rotating through the rotation angle in the first rotation direction, the second rotation direction being opposite the first rotation direction.

13. The robotic cleaner of claim 12, wherein the controller is configured to cause the robotic cleaner to rotate in the second rotation direction until a forward movement direction of the robotic cleaner is substantially parallel with at least a portion of the first second obstacle.

14. The robotic cleaner of claim 11, wherein the controller is configured to cause the robotic cleaner to rotate in the first rotation direction until a forward movement direction of the robotic cleaner is substantially parallel with at least a portion of the first second obstacle.

15. The robotic cleaner of claim 11, wherein the rotation angle is in a range of 255° to 285°.

16. The robotic cleaner of claim 11, wherein the one or more edge cleaning implements includes a side brush.

* * * * *

UNITED STATES PATENT AND TRADEMARK OFFICE
CERTIFICATE OF CORRECTION

PATENT NO. : 12,342,982 B2
APPLICATION NO. : 17/718901
DATED : July 1, 2025
INVENTOR(S) : Derek Lessard Page 1 of 1

It is certified that error appears in the above-identified patent and that said Letters Patent is hereby corrected as shown below:

In the Claims

In Column 12, Line 48-49, in Claim 9, after "rotating" delete "through the rotation angle".

In Column 12, Line 52, in Claim 10, before "obstacle" delete "second".

In Column 12, Line 52, in Claim 10, before "vertically" delete "first".

In Column 12, Line 53, in Claim 10, before "obstacle" delete "first".

In Column 12, Line 56, in Claim 11, before "first rotation" delete "through the rotation angle in a".

In Column 12, Line 57, in Claim 11, before "obstacle" delete "second".

In Column 12, Line 67, in Claim 13, before "obstacle" delete "second".

In Column 13, Line 5, in Claim 14, before "obstacle" delete "second".

Signed and Sealed this
Twelfth Day of August, 2025

Coke Morgan Stewart
*Acting Director of the United States Patent and Trademark Office*